Patented July 19, 1949

2,476,913

UNITED STATES PATENT OFFICE 2,476,913

1-ALKYL-4-(BETA-HYDROXYETHYL-AMINO)-PIPERIDINE BENZOATES

Robert H. Reitsema, Kalamazoo, Mich., assignor to The Upjohn Company, Kalamazoo, Mich., a corporation of Michigan No Drawing. Application April 30, 1948, Serial No. 24,424

5 Claims. (Cl. 260—294)

This invention relates to benzoates of 1-alkyl-4-(β-hydroxyethylamino)-piperidines and salts thereof with acids.

It is an object of this invention to provide new derivatives of 1-alkyl-4-(β-hydroxyethylamino)-piperidines having a variety of uses in the industrial arts and in particular in the pharmaceutical field. Additional objects will become apparent hereinafter.

The compounds are obtained by heating together a 1-alkyl-4-(β-hydroxyethylamino)-piperidine with benzoic acid or benzoic acid derivatives to prepare the esters of the present invention. The benzoic acid, or acid derivatives such as the acid chloride or acid anhydride, may be substituted in the ring by one or more groups such as hydroxyl, alkoxyl, alkyl, amino or nitro groups. Reflux temperature is preferred for rapid completion of the reaction, but other temperatures may be used.

The invention may be more readily understood by a consideration of the following illustrative examples.

*Example 1.—1-ethyl-4-(β-hydroxyethylamino)-piperidine*

Eleven and three-tenths grams of β-aminoethanol and 23.5 grams of 1-ethyl-4-piperidone [J. Am. Chem. Soc. 68, 1239 (1946)] were mixed at room temperature. One hundred milliliters of absolute alcohol was then added and the solution hydrogenated in a suitable apparatus at room temperature and an initial hydrogen pressure of 50 pounds per square inch using platinum oxide as catalyst. After absorption of hydrogen had ceased, the catalyst was removed by filtration and the filtrate fractionally distilled. There was thus obtained 15.8 grams of 1-ethyl-4-(β-hydroxyethylamino)-piperidine, boiling at 117–119 degrees centigrade at a pressure of 17 milimeters of mercury. The dipicrate melted with decomposition at 217–219 degrees centigrade.

*Example 2.—1-ethyl-4-(β-hydroxyethylamino)-piperidine benzoate and salts thereof*

One and seventy-two one-hundredths grams of 1-ethyl-4-(β-hydroxyethylamino)-piperidine dissolved in 25 milliliters of methylene chloride was mixed with 1.4 milliliters of benzoyl chloride. A white solid appeared in a short time. After boiling under reflux for about ten minutes, the mixture was evaporated to dryness. The residue was crystallized from methanol to give needles of 1-ethyl-4-(β-hydroxyethylamino)-piperidine benzoate dihydrochloride, melting at 235 degrees centigrade with decomposition.

Alternatively, the dihydrochloride may be transformed into the free base by mild treatment with alkali, the free base thereafter being extracted from solution and distilled at reduced pressure. Other salts may be prepared from the free bases of the present invention by neutralization with acids such as picric, hydrobromic, sulfuric, acetic, propionic, citric, and tartaric and crystallization from methanol or evaporation of the solution to dryness.

*Example 3.—1-ethyl-4-(β-hydroxyethylamino)-piperidine p-ethoxybenzoate and salts thereof*

The above procedure is repeated but instead of benzoyl chloride an equivalent of p-ethoxybenzoyl chloride is used. The product obtained is 1-ethyl-4-(β-hydroxyethylamino)-piperidine p-ethoxybenzoate dihydrochloride. Similarly, p-methoxybenzoyl chloride and p-propoxybenzoyl chloride give the corresponding 1-ethyl-4-(β-hydroxyethylamino)-piperidine p-alkoxybenzoate dihydrochlorides.

*Example 4.—1-ethyl-4-(β-hydroxyethylamino)-piperidine p-nitrobenzoate and p-aminobenzoate and salts thereof*

In the same manner as in Example 2, an equivalent amount of p-nitrobenzoyl chloride is used. The resulting p-nitrobenzoate of 1-ethyl-4-(β-hydroxyethylamino)-piperidine, when reduced with hydrogen under pressure and platinum oxide as a catalyst, gives the p-aminobenzoate of 1-ethyl-4-(β-hydroxyethylamino)-piperidine.

*Example 5.—1-methyl-4-(β-hydroxyethylamino)-piperidine benzoate and salts thereof*

In the manner of Example 2, equimolar portions of benzoyl chloride and 1-methyl-4-(β-hydroxyethylamino)-piperidine are refluxed together for about fifteen minutes. The white solid 1-methyl-4-(β-hydroxyethylamino)-piperidine benzoate dihydrochloride precipitates and may be crystallized from methanol to give an analytical sample. The free base may be recovered by treatment of the salt with dilute alkali, extraction, and distillation.

Other compounds within the scope of the invention which may be prepared according to the method given are the 1-propyl-, 1-isopropyl-, 1-butyl-, 1-amyl- and other 1-lower-alkyl-4-(β-hydroxyethylamino)-piperidine benzoates, nitrobenzoates, alkoxybenzoates, and p-amino benzoates, which are prepared by using the selected benzoic acid derivative, e. g., the acid, the anhydride or acid halide, and the selected 1-alkyl-4-(β-hydroxyethylamino)-piperidine as reactants in the process.

The compounds of this invention are useful for a variety of purposes. They may be employed as chemical intermediates, as surface agents, or in pharmaceutical preparations. They are of particular value as local anesthetics, and when used for this purpose their solutions may be administered by injection in the customary manner, topical application, or incorporated in ointments, tablets, or the like.

Various modifications may be made in the present invention without departing from the spirit or scope thereof and it is to be understood that I limit myself only as defined in the appended claims.

I claim:

1. A compound selected from the group consisting of 1-lower-alkyl-4-(β-hydroxyethylamino)-piperidine benzoate and acid salts thereof.

2. An acid salt of 1-alkyl-4-(β-hydroxyethylamino)-piperidine benzoate.

3. An acid salt of 1-ethyl-4-(β-hydroxyethylamino)-piperidine benzoate.

4. 1-ethyl-4-(β-hydroxyethylamino)-piperidine benzoate dihydrochloride.

5. The process for the production of 1-alkyl-4-(β-hydroxyethylamino)-piperidine benzoates and salts thereof which includes the step of heating together a 1-alkyl-4-(β-hydroxyethylamino)-piperidine and a compound selected from the group consisting of benzoic acids, benzoic acid halides, and benzoic acid anhydrides to prepare the desired 1-alkyl-4-(β-hydroxyethylamino)-piperidine benzoate compound.

ROBERT H. REITSEMA.

No references cited.